United States Patent [19]

Widart et al.

[11] 4,057,163

[45] Nov. 8, 1977

[54] METAL CONTAINER WITH THICK WALLS

[75] Inventors: Jean E. L. Widart, Saint Severin; Alain F. C. Scailteur, Liege, both of Belgium

[73] Assignee: Cockerill-Ougree-Providence et Esperance-Longdoz en abrege "Cockerill", Seraing, Belgium

[21] Appl. No.: 703,344

[22] Filed: July 8, 1976

[30] Foreign Application Priority Data

July 8, 1975 Belgium .................................. 45082
Feb. 20, 1976 Belgium ................................ 164487

[51] Int. Cl.² ............................................. B65D 7/42
[52] U.S. Cl. ........................................ 220/3; 176/87; 220/83; 249/49
[58] Field of Search .................. 220/83, 73, 3, 18, 85; 403/230; 176/87; 248/68 CB, 56, 67 S, 48.1, 49; 285/61, 150; 249/49

[56] References Cited

U.S. PATENT DOCUMENTS

| | | | |
|---|---|---|---|
| 713,537 | 11/1902 | Treadwell | 248/56 |
| 1,108,328 | 8/1914 | Burnett | 248/56 |
| 1,199,240 | 9/1916 | Burnett | 248/56 |
| 1,834,404 | 12/1931 | Koch | 248/68 CB |
| 2,160,689 | 5/1939 | Van Vulpen | 248/68 CB |
| 2,226,494 | 12/1940 | Jacocks | 220/3 |
| 3,250,319 | 5/1966 | Vost | 220/3 |
| 3,274,671 | 9/1966 | Hauer et al. | 220/83 |
| 3,785,924 | 1/1974 | Notari | 176/87 |
| 3,910,447 | 10/1975 | Bevilacqua | 220/3 |

FOREIGN PATENT DOCUMENTS 702,176  1/1941  Germany ..................... 248/68 CB

*Primary Examiner*—George E. Lowrance
*Assistant Examiner*—Allan N. Shoap
*Attorney, Agent, or Firm*—Sughrue, Rothwell, Mion, Zinn and Macpeak

[57] ABSTRACT

A metal container with thick walls, comprising various parts assembled and welded, and provided with at least one nozzle connecting it to a pipe and support means, each nozzle and the support means being manufactured integral with the part of the container on which they are located.

2 Claims, 5 Drawing Figures

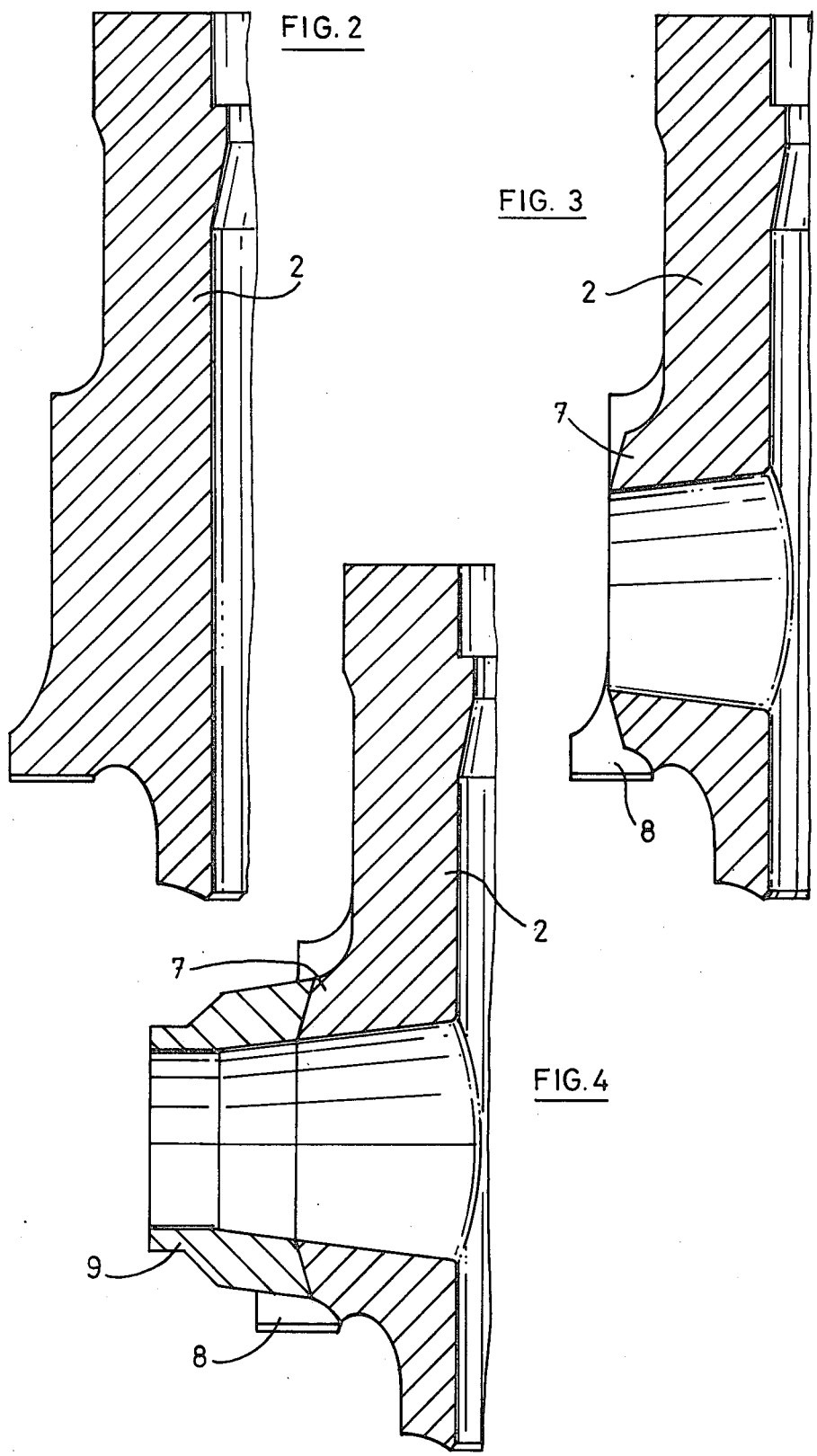

METAL CONTAINER WITH THICK WALLS

The present invention relates to a metal container with thick walls, especially a nuclear reactor pressure vessel.

In numerous industrial fields, such as, in particular, the chemical, petrochemical and nuclear fields, use is made of large metal containers or tanks intended to contain or carry liquid or gaseous fluids under higher or lower pressure. In view of their demensions, and when the pressure which they have to resist is high, these tanks must be given as great a mechanical resistance as possible, which is achieved by making their walls very thick, with thicknesses easily reaching and even exceeding 10 to 25 cm in the case of pressure vessels for nuclear reactors. As a result, metal tanks of this kind and particularly pressure vessels for nuclear reactors are at present built by manufacturing the various component parts separately, and then assembling them successively by welding, to form the vessel.

The nozzles connecting the piping with the tank are welded to the vessel, that is to say that they, too, are manufactured separately, like the other parts of the vessel to which they are then connected and welded.

As for the support pads, they are either made by a weld build-up on the lower part of the nozzles, or they are made up of elements welded or mechanically fixed to the nozzle shell course.

The setting up and manufacture of a thick-walled vessel of the type described hereinbefore give rise to considerable drawbacks.

First of all, the welding operations are numerous and delicate; there is a high risk of faults in the welding of the nozzles, and consequently risks of repairs and wasted time which may possibly have repercussions on commercial operation start-up. The nozzles, which have a complicated geometry and are difficult to machine, have to be made separately, and when they are put into position they have to be welded, then, after the welding has been performed, thermal treatment is required to eliminate internal stresses, and then the joints have to be checked. Moreover, since welding is often performed in several stages, thermal treatment followed by an X-ray check may have to be performed after each phase.

The welding of the nozzles causes fairly substantial ovalisation of the shell course at the level of the nozzles, with a consequent risk of departing from the manufacturing tolerances imposed by the technical specifications.

Owing to the fact that the welded nozzles greatly increase the overall dimensions of the body of the vessel, in the case of a nuclear reactor vessel it is essential to provide, in the upper part of the well into which it is introduced on site, sufficient clearance to enable said nozzles to pass through easily, and this makes it impossible to complete the concreting of the well before the vessel is put into position, thus complicating the well-concreting operations.

The aim of the invention is to provide a metal container with thick walls which are provided with nozzles and support means and which has a minimum of joints or welding deposits, and which, whilst enabling the manufacturing period to be shortened, is less expensive than the containers of conventional construction and makes it possible to eliminate ovalisation at the level of the nozzles.

According to the invention, there is provided a thick walled metal container comprising various parts which are assembled and welded, at least one nozzle connecting it to a pipe and support means, particularly a nuclear reactor vessel, each nozzle and the support means being manufactured integral with the part of the container on which they are located.

According to a first embodiment, that part of the container or vessel which carries the nozzle and support means is obtained by forging an ingot the weight of which corresponds to the part to be manufactured. According to a second embodiment, this part is manufactured by casting or moulding.

In the drawings:

FIG. 2 is an axial section through part of the wall of the nozzle shell course before the nozzles and support means have been machined;

FIG. 3 is an axial section through part of the wall of the nozzle shell course after the nozzles and support means have been machined;

FIGS. 4 and 5 show two variants of the shell course in FIG. 3.

Figure 1:
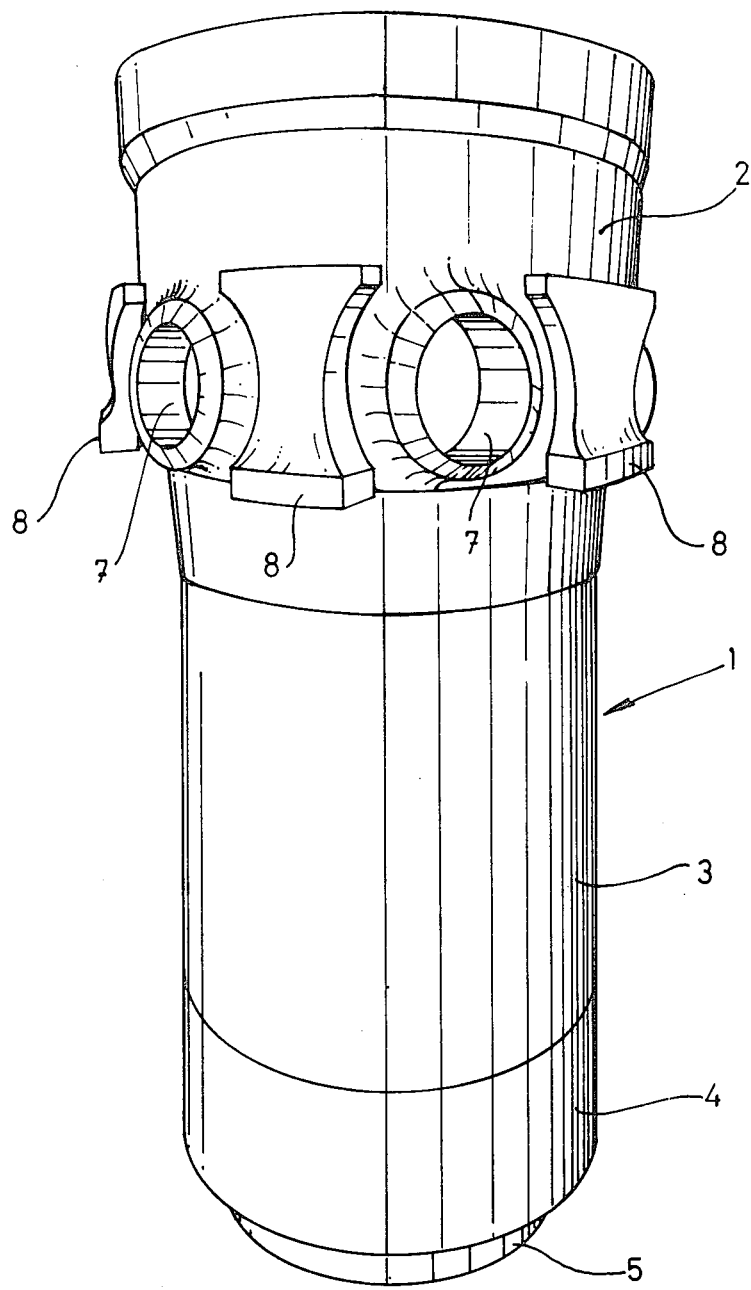
FIG. 1 is a general view of a reactor vessel according to the invention.

The vessel 1, generally cylindrical in form, consists of the nozzle shell course 2, the core shell course 3, a junction ring 4 and the bottom cap 5. A lid (not shown) seals off the top of the nozzle shell course 2. Around the periphery of the latter, a certain number of nozzles 7 are visible, which serve to connect the external piping. Are also visible support means 8 which serve to support the vessel 1. In the embodiment shown, the support means 8 are separate, but they could readily be joined to one another on the periphery of the shell course 2 or form a closed or open support ring.

Each of the parts is obtained starting from an ingot of sufficient tonnage which undergoes a forging process. In particular, the upper shell course 2 is also produced in this way, but at the places where there is to be a nozzle or support means, it is given a thickness such that said nozzle or support means can be formed by forging or any type of machining.

FIG. 2 shows a section through part of the wall of the shell course 2 before the nozzles and support means are machined. The nozzles 7 and support means 8, as shown in FIG. 3, are produced by suitable machining of the part in FIG. 2.

In this manner, the nozzles and the support means form an integral part of the wall. In other words, the nozzles and support means are made directly in one piece with the shell course to which they belong, so that they are embedded in the mass and have only to undergo the final machining processes.

The metal vessel or container realized as described has numerous important advantages.

First of all, the welded joints required to fix nozzles are not needed, and this obviously eliminates the welding difficulties and reduces the risks of repair.

Moreover, the absence of welded nozzles and support means reduces the cost of the vessel, which now has only a few circular joints. Ovalisation at the level of the nozzles is virtually non-existent, since there is no assembly by welding at this point in the shell course itself. Furthermore, since the nozzles do not exceed the external diameter of the body of the vessel, the vessel well can virtually be built entirely before said vessel is put into position. Finally, the joints in the body of the vessel can be inspected much more easily and rapidly on the spot since the joints to be checked are few in number, have a simple shape and are relatively easily accessible.

Moreover, the support means are separate from the nozzles and therefore no longer act directly on them (chiefly by accident condition loadings). Whilst being extremely robust, these support means transmit reactions which nevertheless attack the shell course only at its points of maximum resistance.

FIG. 4 shows a variant. Fixed to the nozzle 7 is an extension sleeve 9 to enable said nozzle to be connected to the pipe, if this proves necessary.

Figure 5:
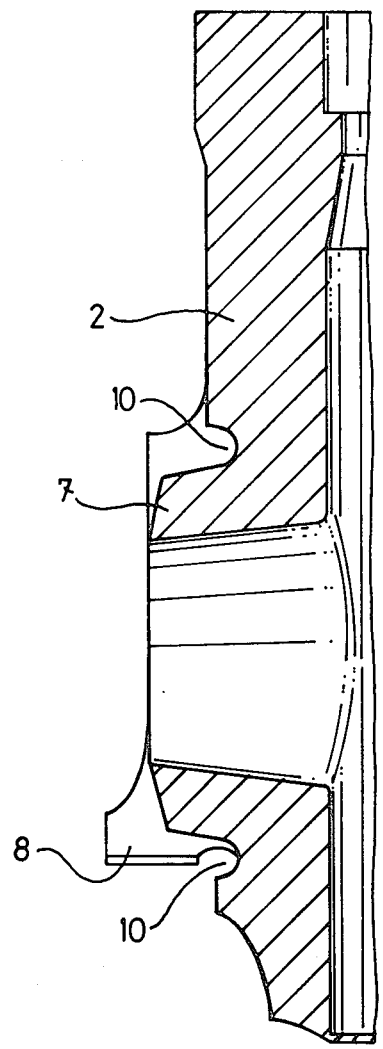

FIG. 5 shows another variant. In the connection between the nozzle 7 and shell course 2 is formed a groove 10, termed a flexibility groove, in order to facilitate the assembly of the nozzles 7 either with an extension sleeve such as the sleeve 9 in FIG. 4, or with piping joining directly onto the vessel. In the latter case, the groove 10 improves the stress distribution of the nozzle and pipes during operation of the reactor.

The invention is in no way limited to the examples described, but it is possible to manufacture the lower head or one or other of the other shell courses in the body 1 as well as the lid or any other part of a thick walled metal container with one or other of the nozzles and possible support means, in the same way.

Nor is the invention limited to manufacture of a shell course or other integrated part by forging, since they may also be manufactured by casting or moulding.

What is claimed is:

1. In a forged metal cylindrical nuclear reactor pressure vessel including a core shell course portion, a nozzle shell course portion welded to one end of the core shell course portion, and a bottom cap closing off the other end of the core shell course portion, the improvement wherein: said nozzle shell course portion comprises an integral, forged wall portion of enlarged thickness and defining a radially outward projecting nozzle and support ring, said nozzle and support ring being machined at circumferentially spaced locations to define circular nozzles separated by integral radially projecting support means with said support means and said nozzles occupying a common circumferential plane.

2. A nuclear reactor pressure vessel as claimed in claim 1, further comprising extensive sleeves welded to the radially outer end of each of the nozzles.

* * * * *